(12) United States Patent
Lichtenegger et al.

(10) Patent No.: US 9,644,715 B2
(45) Date of Patent: May 9, 2017

(54) TRANSMISSION AND A METHOD FOR OPERATING SAME (71) Applicant: AVL LIST GMBH, Graz (AT)

(72) Inventors: Stefan Lichtenegger, St. Stefan (AT); Konstantin Erjawetz, Voitsberg (AT)

(73) Assignee: AVL List GmbH, Graz (AT)

( * ) Notice: Subject to any disclaimer, the term of this patent is extended or adjusted under 35 U.S.C. 154(b) by 121 days.

(21) Appl. No.: 14/437,361

(22) PCT Filed: Oct. 17, 2013

(86) PCT No.: PCT/EP2013/071681
§ 371 (c)(1),
(2) Date: Apr. 21, 2015

(87) PCT Pub. No.: WO2014/063980
PCT Pub. Date: May 1, 2014

(65) Prior Publication Data
US 2015/0276022 A1 Oct. 1, 2015

(30) Foreign Application Priority Data

Oct. 22, 2012 (AT) .............................. A 50464/2012
May 8, 2013 (AT) .............................. A 50310/2013

(51) Int. Cl.
F16H 3/62 (2006.01)
F16H 3/44 (2006.01)
(Continued)

(52) U.S. Cl.
CPC ............ *F16H 3/725* (2013.01); *B60K 6/365* (2013.01); *B60K 6/48* (2013.01);
(Continued)

(58) Field of Classification Search
CPC .................. F16H 2200/0021; F16H 2200/202
See application file for complete search history.

(56) References Cited

U.S. PATENT DOCUMENTS 5,106,352 A 4/1992 Lepelletier
5,342,258 A * 8/1994 Egyed ...................... F16H 3/66
475/280

(Continued)

FOREIGN PATENT DOCUMENTS

DE 102005039592 2/2007
WO 2006048126 5/2006
(Continued)

OTHER PUBLICATIONS

English Abstract of DE 102005039592.

*Primary Examiner* — Tisha Lewis
(74) *Attorney, Agent, or Firm* — Dykema Gossett PLLC (57) ABSTRACT A transmission includes a drive train having a primary drive with a primary drive shaft (16), particularly for a vehicle, and includes a Ravigneaux planetary gearset (2) which has a double planetary gear with two sun gear shafts (10, 13), one planetary carrier shaft (18) and at least one ring gear shaft (12), as well as an upstream single planetary gearset (3) which is designed as a reduction gearing and includes the gear elements of sun gear (5a), planetary carrier (8a) and ring gear (6a). A first of the gear elements of the single planetary gear set (2), particularly the sun gear (5a), is designed to be fixed to a housing. At least one first element of the Ravigneaux planetary gear set (2) is drive-connected, preferably permanently, to a secondary drive (21) which is particularly preferred to be in the form of an electrical machine.

30 Claims, 4 Drawing Sheets (51) Int. Cl.
*F16H 3/72* (2006.01)
*B60K 6/365* (2007.10)
*B60K 6/48* (2007.10)

(52) U.S. Cl.
CPC .................. *F16H 2003/445* (2013.01); *F16H 2200/2007* (2013.01); *F16H 2200/2023* (2013.01); *F16H 2200/2025* (2013.01); *F16H 2200/2041* (2013.01); *F16H 2200/2097* (2013.01); *Y02T 10/6221* (2013.01); *Y10S 903/917* (2013.01)

(56) References Cited

U.S. PATENT DOCUMENTS

| 8,246,500 B2 | 8/2012 | Eto et al. |
| 2008/0121447 A1 | 5/2008 | Lang et al. |

FOREIGN PATENT DOCUMENTS

| WO | 2006099898 | 9/2006 |
| WO | 2012076106 | 6/2012 |

\* cited by examiner

TRANSMISSION AND A METHOD FOR OPERATING SAME

BACKGROUND OF THE INVENTION

Field of the Invention

The invention relates to a transmission which comprises a drive train having a primary drive with a primary drive shaft, especially for a vehicle, and which comprises a Ravigneaux planetary gear set which has a double planetary gear with two sun gear shafts, one planetary carrier shaft and at least one ring gear shaft, as well as an upstream single planetary gear set which is arranged as a reduction gearing and comprises the gear elements of sun gear, planetary carrier and ring gear, wherein a first of said gear elements of the single planetary gear is designed to be fixed to a housing. The invention further relates to a method for operating the transmission.

The Prior Art

A transmission of the kind mentioned above is known from U.S. Pat. No. 5,106,352 A. Such so-called Lepelletier transmissions are used for example in automatic transmissions of vehicles and represent a further development of the so-called Ravigneaux set—a double planetary gear. The Lepelletier set is produced in that a Ravigneaux set is preceded by a further single planetary gear and is connected by clutches. The ring gear of the single planetary gear is permanently connected to the engine drive shaft. This means that the single planetary gear set is always co-rotated even in idle running. The power take-off occurs via the ring gear of the Ravigneaux set and is connected via the differential gear to the drive wheels. The sun gear of the single planetary gear set is permanently blocked. It is disadvantageous that a large number of clutches and brakes as well as separate acceleration devices used for acceleration such as a hydrodynamic torque converters or the like are required.

DE 10 2004 053 044 A1 discloses a transmission for a hybrid drive having a double planetary gear set and a single planetary gear set, wherein each sun gear shaft of the double planetary gear set is drive-connected to one respective electric machine.

It is the object of the invention to avoid the aforementioned disadvantages and to achieve high functionality in a transmission of the type mentioned above with little effort and little need for space.

SUMMARY THE INVENTION

This is achieved in accordance with the invention such a way that at least one first element of the Ravigneaux planetary gear set is drive-connected to a secondary drive, preferably permanently. The secondary drive can advantageously be formed by an electric machine. This allows combining the primary drive and the secondary drive in an advantageous manner, or using them alternatively.

A second element of the Ravigneaux planetary gear set can advantageously be blocked by means of a braking device.

It is especially advantageous if a third element of the Ravigneaux planetary gear set, preferably a first sun gear shaft of the Ravigneaux planetary gear set, is drive-connected or can be drive-connected to a second gear element of the single planetary gear set, preferably the planetary carrier of the single planetary gear set.

The first element of the Ravigneaux planetary gear set can be formed by a second sun gear shaft and the second element by the planetary carrier shaft. It can alternatively be provided in this respect that the first element is formed by the planetary carrier shaft of the Ravigneaux planetary gear set and the second element by the second sun gear shaft of the Ravigneaux planetary gear set. As a result, the positions of the secondary drive and the braking device within the Ravigneaux planetary gear set can advantageously be exchanged for achieving special requirements concerning the need for space and the functional requirements.

The first sun gear shaft and the second sun gear shaft have different directions of rotation, because the first sun gear shaft acts on a set of second planetary gears via a set of the first planetary gears, whereas the second sun gear shaft acts directly on the set of the second planetary gears.

A further alternative variant in accordance with the invention provides that the first element of the Ravigneaux planetary gear set is formed by a second ring gear. The secondary drive can be drive-connected indirectly via a speed step or directly to the second ring gear. This arrangement offers the advantage that a second continuously variable power-split operating range can be realised.

The single planetary gear set forms a reduction gearing and is preferably formed as a minus gear set. Minus gear sets are planetary gears in which in the case of a fixed shaft the two other shafts rotate in different directions of rotation.

In this respect, at least one element of the Ravigneaux planetary gear set, preferably the planetary carrier shaft, can be drive-connected to the primary drive (e.g. an internal combustion engine), especially via a first clutch device. The same element of the Ravigneaux planetary gear set can alternatively be drive-connected, preferably permanently, to a prime mover formed by an electric machine.

A highly compact configuration can be achieved when the Ravigneaux planetary gear set and/or the single planetary gear set is arranged within a rotor of the primary or secondary drive.

In order to enable a continuously variable power-split operating range on the one hand and three respective gear steps for combined drive and purely electrical drive on the other hand, the transmission requires only one single braking device for the blockage of a sun gear shaft of the Ravigneaux planetary gear set and three clutch devices. A first clutch device is arranged between the primary drive shaft and a transmission drive shaft. In accordance with a preferred embodiment of the invention, a second clutch device can be arranged between the two sun gear shafts of the Ravigneaux planetary gear set and a third clutch device between the transmission drive shaft and the planet carrier shaft of the Ravigneaux planetary gear set.

In a first embodiment of the invention, only the first clutch device is activated in the continuously variable power-split operating range, i.e. it is closed, whereas the other clutch devices and the braking device are deactivated, i.e. therefore open. In other embodiments in accordance with the invention, the first clutch device and the second or third clutch device are activated in at least one continuously variable power-split operating range. In one embodiment in which the secondary drive acts via a second ring gear on the Ravigneaux planetary gear set, the first and the second clutch device are activated in a first continuously variable power-split operating range, and the first clutch device and third clutch device are activated in a second continuously variable power-split operating range.

In the continuously variable power-split operating range, the primary drive can be operated in a stationary manner and the secondary drive as a generator or a motor. In the case of continuously variable power-split acceleration, current can be generated during the acceleration, up to a specific limit speed. Continuous electrodynamic acceleration is further possible. A separate acceleration element such as a hydrodynamic torque converter can be omitted. The first clutch device is only provided with a separating and connection function and is not used as an acceleration clutch.

The braking device, the second clutch device or the third clutch device are activated in at least one gear step operating range.

In an alternative, especially advantageous embodiment of the invention, the second clutch device is not arranged between the two sun gear shafts of the Ravigneaux planetary gear set, but between a first sun gear shaft of the Ravigneaux planetary gear set and a summary shaft of the single planetary gear set, especially the planetary carrier. The summary shaft can be made torque-free by separating the drive connection between the first sun gear of the Ravigneaux planetary gear set and the planetary carrier of the single planetary gear set. The first and the third clutch device can be positioned equally, as in the embodiment already explained above. Two elements of the group of the second clutch device, third clutch device and braking device are activated in each gear step range, apart from the first clutch device, and the third element is deactivated. This allows a comparatively large spread in the individual gear step ranges. The efficiency of the transmission is further improved.

The changeover from continuously variable power-split operating range to one of the three gear step operating ranges (gears) can occur during driving operation. During the operation in one of the three shiftable gears, secondary operation can selectively be operated as a generator or a motor in order to perform hybrid functionalities such as "boosting" (support of the drive torque of the primary drive), "recuperation", "shifting of the load point" or "cruising". Electromotive torque application can occur in all gears. Very high efficiency can be achieved during recuperation because only low losses (only no-load losses) occur between the power take-off and the electric machine.

There is a considerable reduction in the clutch and braking devices in comparison with known Lepelletier transmissions.

BRIEF DESCRIPTION OF THE DRAWINGS

The invention will now be explained in greater detail by reference to the schematic drawings, wherein.

The invention is now explained in closer detail by reference to the schematic drawings, wherein.

DETAILED DESCRIPTION OF THE DEPICTED EMBODIMENTS

Parts with the same function are provided in the embodiments with the same reference numerals.

The transmission 1 comprises in all embodiments a respective Ravigneaux planetary gear set 2 with an upstream single planetary gear set 3, wherein the single planetary gear set 3 is arranged as a reduction planetary gear set which is formed by a minus gear set.

The Ravigneaux planetary gear set 2, which is substantially formed by a double planetary gear set, comprises a first and a second sun gear 10*a*, 13*a*, which are connected to respective first and second sun gear shafts 10, 13, and at least one first ring gear 12*a* which is connected to a ring gear shaft 12.

A set of first planetary gears 18*a* meshes with the first ring gear 12*a* and the second sun gear 13*a*. A set of second planetary gears 18*b* meshes with the first sun gear 10*a* and is in engagement with the first planetary gears 18*a*.

Figure 8:
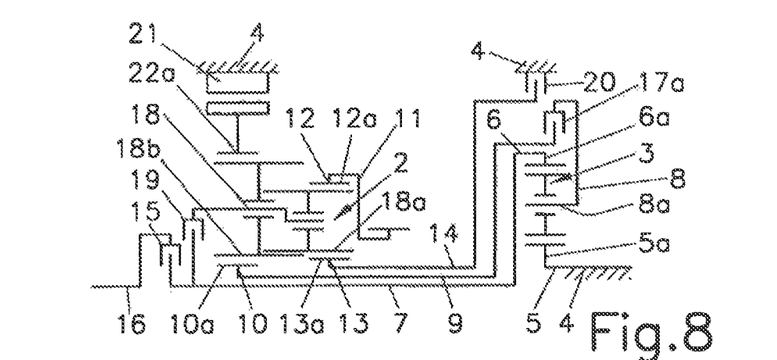
FIG. 8 shows a transmission in accordance with the invention in a fourth embodiment.
Figure 11:
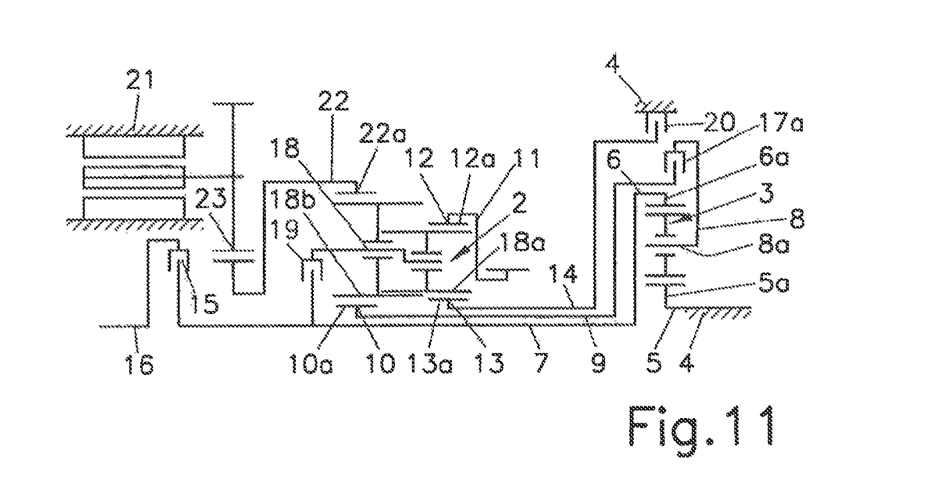
FIG. 11 shows a transmission in accordance with the invention in a fifth embodiment.

In the embodiments according to FIG. 8 and FIG. 11, the Ravigneaux planetary gear set 2 comprises a second ring gear 22*a* which is in meshing engagement with the planetary gears 18*b*.

The single planetary gear set 3 comprises in all embodiments a first differential shaft 5 of the sun gear 5*a*, which first differential shaft is permanently coupled to the housing 4 of the transmission 1. The second differential shaft 6 of the ring gear 6*a* of the single planetary gear set 2 is permanently rotatably connected to the transmission drive shaft 7. The summary shaft 8 of the planetary carrier 8*a* of the single planetary set 3 is permanently connected via a first transmission shaft 9 to the first sun gear shaft 10 of the Ravigneaux planetary gear set 2. The power take-off occurs via a transmission output shaft 11, which is permanently rotatably in connection with a ring gear shaft 12 of the Ravigneaux planetary gear set 2. The second sun gear shaft 13 of the Ravigneaux planetary gear set 2 is in rotatable connection with a second transmission shaft 14. The first and the second transmission shafts 9, 14 and the transmission drive and output shafts 7, 11 can be arranged as coaxially formed central shafts.

The transmission drive shaft 7 can be drive-connected via a first clutch device 15 and a primary drive shaft 16 to a primary drive (not shown in closer detail). The primary drive can be an internal combustion engine for example.

Figure 1:
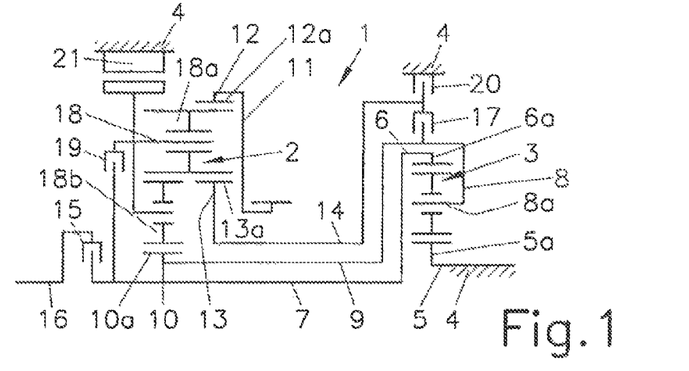
FIG. 1 shows a transmission in accordance with the invention in a first embodiment.

In the first variant shown in FIG. 1, a second clutch device 17 is provided between the first and the second transmission shaft 9, 14, which allows connecting the two sun gear shafts 10, 13 of the Ravigneaux planetary gear set 2.

Figure 4:
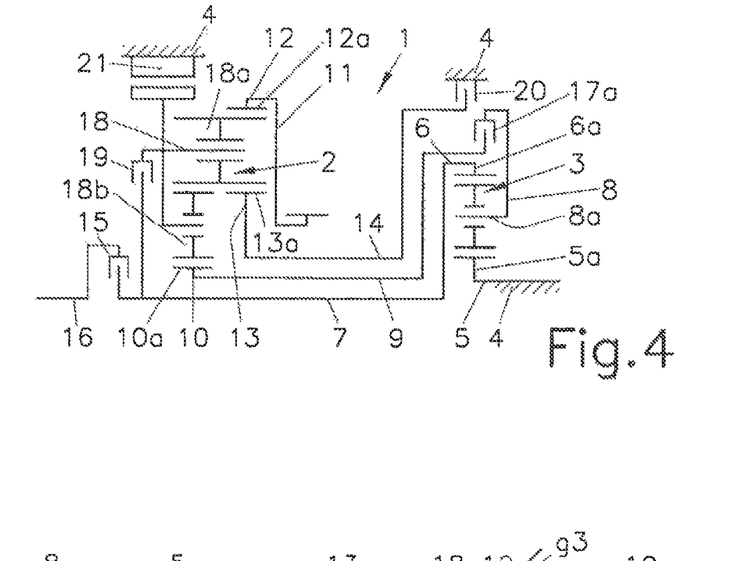
FIG. 4 shows a transmission in accordance with the invention in a second embodiment.

In contrast thereto, the second clutch device 17*a* is arranged in the second embodiment shown in FIG. 4 between the first transmission shaft 9 and the summary shaft 8 of the planetary carrier 8*a* of the single planetary gear set 3, via which the rotational connection between the planetary carrier 8*a* of the single planetary set 3 and the first sun gear 10*a* of the Ravigneaux planetary gear set 2 can be interrupted. The summary shaft 8 (planetary carrier shaft) of the single planetary set 3 can thus be switched torque-free by the second clutch device 17*a*.

The planetary carrier shaft 18 of the Ravigneaux planetary gear set 2 can rotatably be connected in all three embodiments via a third clutch device 19 to the transmission drive shaft 7. Furthermore, the second sun gear shaft 13 of the Ravigneaux planetary gear set 2 or the second transmission shaft 14 can be blocked by a braking device 20.

The rotor of the secondary drive 21 formed by an electric machine is permanently drive-connected to the planetary carrier shaft 18 of the Ravigneaux planetary gear set 2.

Figure 2:
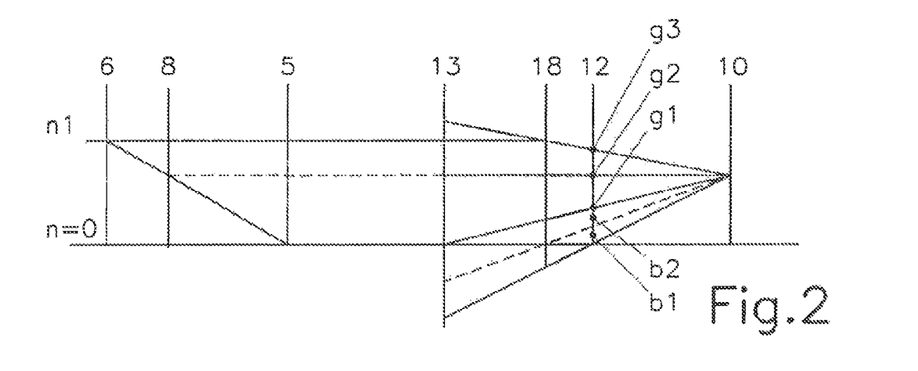
FIG. 2 shows a speed-ladder diagram of said transmission.

FIG. 2 shows the possible operating modes of the transmission 1 shown in FIG. 1 on the basis of a ladder diagram for the speeds n with the drive speed n1 of the primary drive.

Three forward gears g1, g2, g3 can be switched by activating the second or third clutch device 17, 19 or the braking device 20. The first clutch device 15 is used for decoupling the primary drive and is only deactivated when the drive is exclusively taken over by the secondary drive 21, or there is no drive.

If none of the clutch or braking devices 17, 19, 20 is activated, the drive train can be operated in a continuously variable power-split operating range, in that advantageously the primary drive is operated in a stationary manner and the secondary drive 21 is operated as a generator in a first operating range b1 and is operated in a second operating range b2 as a motor. This allows continuously variable electrodynamic acceleration, so that a separate acceleration element such as a hydrodynamic torque converter or acceleration clutch can be avoided. The changeover from the continuously variable power-split operation to one of the three switchable gears g1, g2, g3 can occur during driving. During operation in one of the three switchable gears g1, g2, g3, the secondary drive 21 can selectively be operated as a generator or a motor in order to enable the hybrid functionalities such as "boosting", "recuperation", "shifting of load point" or "cruising".

Figure 3:
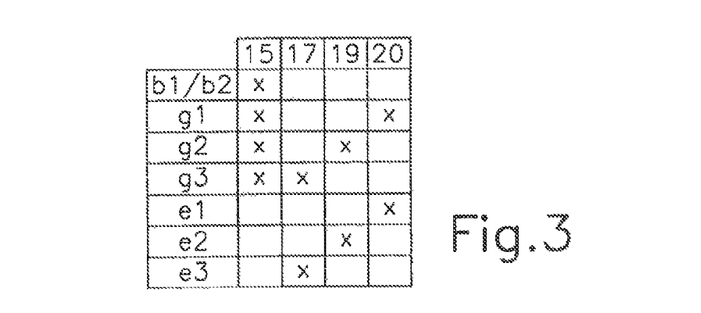
FIG. 3 shows a switching matrix of said transmission.

FIG. 3 shows a switching matrix of the clutch devices 15, 17, 19 and the braking device 24 the operating modes shown in FIG. 2, wherein an "X" shows the activated state of the respective clutch devices 15, 17, 19 or the braking device 20. In this respect, the operating modes (gear step ranges) e1, e2 and e3 for the pure drive by the drive machine 21 (apart from the position of the first clutch device 15) are equivalent to the operating modes (gear step ranges) g1, g2 and g3 for the combined drive and can both be forward as well as reverse gears.

Figure 5:
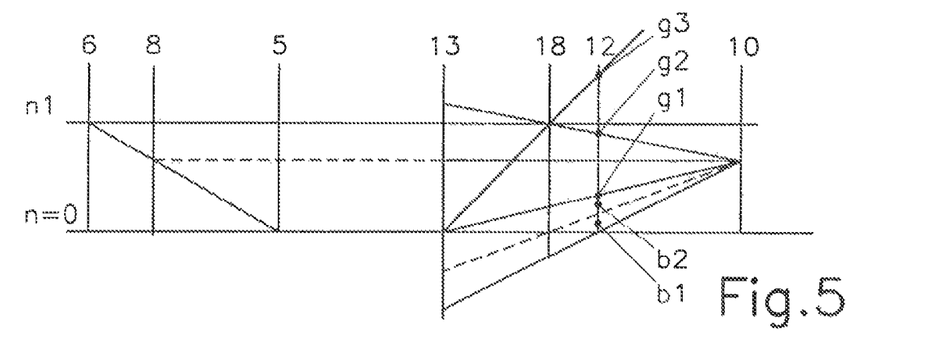
FIG. 5 shows a speed-ladder diagram of said transmission.

FIG. 5 shows the possible operating modes of the transmission 1 shown in FIG. 4 on the basis of a ladder diagram for the speeds n with the drive speed n1 of the primary drive.

Three forward gears g1, g2 and g3 can be switched by activating the second clutch device 17*a* and the braking device 20, or the second and third clutch device 17*a*, 19, the third clutch device 19 and the braking device 20. The first clutch device 15 is used for decoupling the primary drive and is also only deactivated here when the drive is taken exclusively from the drive machine 21, or there is no drive at all.

If none of the clutch or braking devices 17*a*, 19, 20 is activated, the drive train can also be operated in the second embodiment in a continuously variable power-split operating range, in that advantageously the primary drive is operated in a stationary manner and the drive machine 21 is operated as a generator in a first operating range b1 and is operated in a second operating range b2 as a motor. This allows continuously variable electrodynamic acceleration, so that a separate acceleration element such as a hydrodynamic torque converter or an acceleration clutch can be avoided. The changeover from continuously variable power-split operation to one of three switchable gears g1, g2, g3 can occur during driving. The secondary drive 21 can selectively be operated as a generator or a motor during the operation in one of the three switchable gears g1, g2, g3 in order to enable hybrid functionalities such as "boosting", "recuperation", "shifting of the load point" or "cruising".

Figure 6:
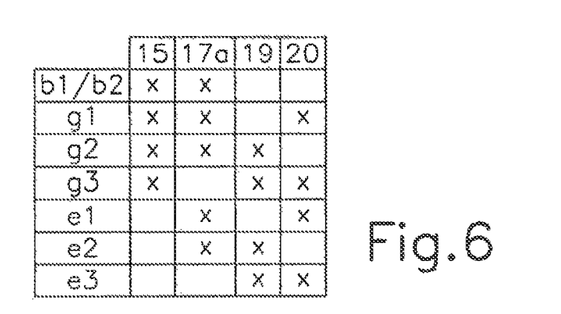
FIG. 6 shows a switching matrix of said transmission.

The speed-ladder diagram for the second embodiment shown in FIG. 5 clearly shows that by the arrangement of the second clutch 17*a* between the planet carrier 8*a* of the single planetary gear set 3 and the first sun gear 10*a* of the Ravigneaux planetary gear set 2, a larger spread is enabled in the individual gear step ranges g1, g2, g3; e1, e2, e3 in comparison with the first embodiment. Furthermore, the powershifting capability can be improved because only one respective clutch/braking device 15, 17*a*, 19, 20 needs to be faded out in the gear step ranges g1, g2, g3; e1, e2, e3. Furthermore, an improvement in the efficiency can also be achieved because out of the four switching elements (clutch devices 15, 17*a*, 19 and braking device 20) three are activated in the combustion-motive gear step ranges g1, g2, g3 and two in the electric gear step ranges e1, e2, e3 (closed), as is shown in the switching matrix of FIG. 6 of the clutch devices 15, 17*a*, 19 and the braking device 20 for the embodiment shown in FIG. 4. The states of the clutch devices 15, 17*a*, 19 and the braking device 20 are entered for the operating modes shown in FIG. 5, wherein an "X" represents the activated state of the respective clutch devices 15, 17*a*, 19 or braking device 20. The operating modes (gear step ranges) e1, e2 and e3 for pure drive by the drive machine 21 (apart from the first clutch device 15) are equivalent to the operating modes (gear step ranges) g1, g2 and g3 for combined drive, and can be both forward and also reverse gears.

Figure 7:
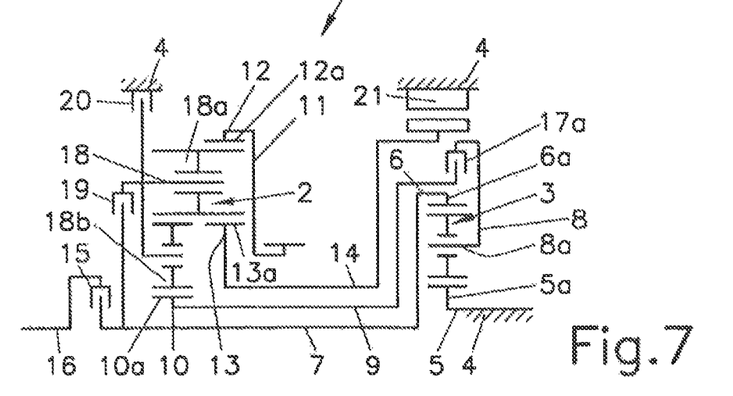
FIG. 7 shows a transmission in accordance with the invention in a third embodiment.

The positions of the secondary drive 21 and the braking device 20 in the Ravigneaux planetary gear set 2 can also be exchanged, e.g. for improvements concerning spatial constrictions and functional requirements. The transmission 1 shown in FIG. 7 differs from the embodiment shown in FIG. 4 in such a way that the brake 20 acts on the planet carrier shaft 18 and the secondary drive 21 (via the second transmission shaft 14) on the sun gear shaft 13.

It is further also possible to allow the secondary drive 21 to act on the Ravigneaux planetary gear set 2 via a further element such as a second ring gear 22*a*, as shown in FIGS. 8 and 11. The second ring gear 22*a* can be in engagement with the second planetary gears 18*b*. FIG. 8 shows an embodiment in which the secondary drive 21 is directly drive-connected to the second ring gear 22*a*. FIG. 11 shows a further example, in which the secondary drive 21 is indirectly connected via a gear step 23 and a ring gear shaft 22 to a second ring gear 22*a*.

Figure 9:
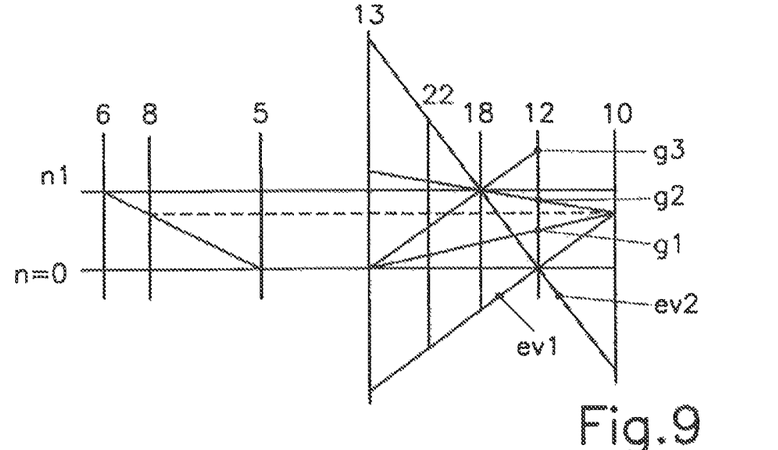
FIG. 9 shows a speed-ladder diagram of said transmission.
Figure 10:
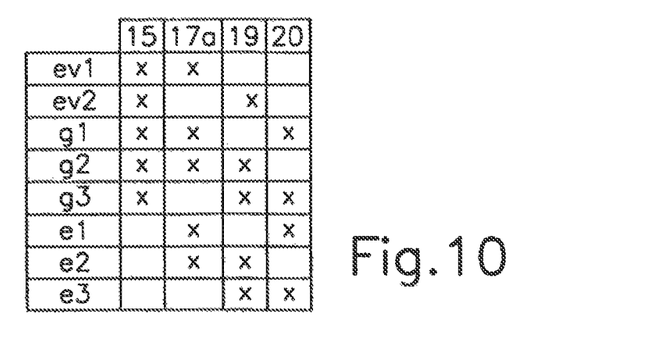
FIG. 10 shows a switching matrix of said transmission.

These embodiments offer the advantage that in addition to a continuously variable power-split first operating range ev1 a continuously variable power-split second operating range ev2 can be realised, as is shown in the speed-ladder diagram shown in FIG. 9 and the switching matrix shown in FIG. 10. FIGS. 9 and 10 differ from FIG. 5 and FIG. 6 mainly by the additional operating range ev2, in which the first clutch 15 and the third clutch 19 are activated. The first clutch 15 and the second clutch 17*a* are activated in the first operating range ev1 on the other hand, in analogy to the operating range b1/b2 of FIG. 5 and FIG. 6. As in the operating range b1/b2, the secondary drive 21, which is formed by an electric machine for example, can also be operated as a motor or a generator in the operating ranges ev1 and ev2.

The terms "primary" and "secondary" in the primary and secondary drive are used in this case in a neutral way and are only used for distinguishing the drives. Both the primary drive and also the secondary drive can be arranged per se as the primarily or predominantly used standard or main drive for the vehicle, wherein the respective other drive can be arranged as a temporarily connectable auxiliary drive. It is also possible to arrange both drives equally and to use them both as a standard or main drive and also as an auxiliary drive, and optionally in an alternating fashion. Furthermore, a common equal use of the two drives in the shifting ranges g1, g2, g3 is possible.

The invention claimed is:

1. A transmission which comprises a drive train having a primary drive with a primary drive shaft for a vehicle, and which comprises a Ravigneaux planetary gear set which has a double planetary gear with two sun gear shafts, one planetary carrier shaft and at least one ring gear shaft with a first ring gear, and an upstream single planetary gear set which is arranged as a reduction gearing and comprises the gear elements of sun gear, planetary carrier and ring gear, wherein a first of said gear elements of the single planetary gear is designed to be fixed to a housing, wherein at least one first element of the Ravigneaux planetary gear set is drive-connected to a secondary drive, wherein the first element of the Ravigneaux planetary gear set is formed by a second ring gear.

2. The transmission according to claim 1, wherein a second element of the Ravigneaux planetary gear set can be blocked by means of a braking device.

3. The transmission according to claim 1, wherein a third element of the Ravigneaux planetary gear set is drive-connected to a second gear element of the single planetary gear set, or can be drive-connected by means of a second clutch device.

4. The transmission according to claim 1, wherein the first element is formed by a second sun gear shaft or the planet carrier shaft of the Ravigneaux planetary gear set, and the second element is formed by the planet carrier shaft, or the second sun gear shaft of the Ravigneaux planetary gear set.

5. The transmission according to claim 1, wherein at least one element of the Ravigneaux planetary gear set can be drive-connected to the primary drive.

6. The transmission according to claim 1, wherein the Ravigneaux planetary gear set and/or the single planetary gear set are arranged within a rotor of the primary drive or secondary drive.

7. The transmission according to claim 1, wherein the primary drive shaft and a transmission drive shaft are rotatably connectable by means of a first clutch device.

8. The transmission according to claim 1, wherein a transmission drive shaft and the planetary carrier shaft of the Ravigneaux planetary gear set are rotatably connectable by means of a third clutch device.

9. A method for operating a transmission which comprises a drive train having a primary drive with a primary drive shaft for a vehicle, and which comprises a Ravigneaux planetary gear set which has a double planetary gear with two sun gear shafts, one planetary carrier shaft and at least one ring gear shaft with a first ring gear, and an upstream single planetary gear set which is arranged as a reduction gearing and comprises the gear elements of sun gear, planetary carrier and ring gear, wherein a first of said gear elements of the single planetary gear is designed to be fixed to a housing, wherein at least one first element of the Ravigneaux planetary gear set is drive-connected to a secondary drive, and the first element of the Ravigneaux planetary gear set is formed by a second ring gear, and wherein the primary drive shaft and a transmission drive shaft are rotatably connectable by means of a first clutch device, and the transmission drive shaft and the planetary gear shaft of the Ravigneaux planetary gear set are rotatably connectable by means of a third clutch device, comprising closing the first clutch device in at least one continuously variable power-split operating range, and closing at least one first device of the group comprising the braking device, second clutch device or third clutch device in at least one gear step operating range.

10. The method according to claim 9, comprising activating the first clutch device and the second clutch device in a first continuously variable power-split operating range, and closing the first clutch device and the third clutch device in a second continuously variable power-split operating range.

11. The method according to claim 9, comprising closing the primary drive and the secondary drive in the continuously variable power-split operating range.

12. The method according to claim 9, comprising operating the primary drive in a transient manner in at least one gear step operating range and operating the secondary drive as a motor or a generator.

13. The method according to claim 9, comprising deactivating the primary drive in at least one gear step operating range and operating the secondary drive as a motor or a generator.

14. The method according to claim 9, comprising closing the braking device in a first gear step operating range.

15. The method according to claim 9, comprising closing the third clutch device is closed in a second gear step operating range.

16. The method according to claim 9, comprising closing the third clutch device and the braking device in a third gear step operating range.

17. The transmission according to claim 1, wherein the sun gear of the single planetary gear is designed to be fixed to the housing.

18. The transmission according to claim 1, wherein at least one first element of the Ravigneaux planetary gear set is drive-connected permanently to the secondary drive.

19. The transmission according to claim 1, wherein the secondary drive is formed by an electric machine.

20. The transmission according to claim 3, wherein a first sun gear shaft of the Ravigneaux planetary gear set is drive-connected to the second gear element or can be drive-connected by means of the second clutch device.

21. The transmission according to claim 3, wherein the third element of the Ravigneaux planetary gear set is drive-connected to the planet carrier of the single planetary gear set, or can be drive-connected by means of the second clutch device.

22. The transmission according to claim 3, wherein the third element of the Ravigneaux planetary gear set is drive-connected in a permanent manner to the second gear element.

23. The transmission according to claim 5, wherein the first element of the Ravigneaux planetary gear set can be drive-connected to the primary drive.

24. The transmission according to claim 5, wherein the planetary carrier shaft of the Ravigneaux planetary gear set can be drive-connected to the primary drive.

25. The transmission according to claim 5, wherein the primary drive is formed by an internal combustion engine.

26. The method according to claim 9, comprising closing the second or third clutch device in at least one continuously variable power-split operating range.

27. The method according to claim 9, comprising closing at least two first devices of the group of the braking device, second clutch device or third clutch device in at least one gear step operating range.

28. The method according to claim 11, comprising operating the primary drive in a stationary manner, and the secondary drive as a motor or a generator.

29. The method according to claim 14, comprising closing also the second clutch device in a first gear step operating range.

30. The method according to claim 15, comprising closing also the second clutch device in a second gear step operating range.

* * * * *